Figure 6:
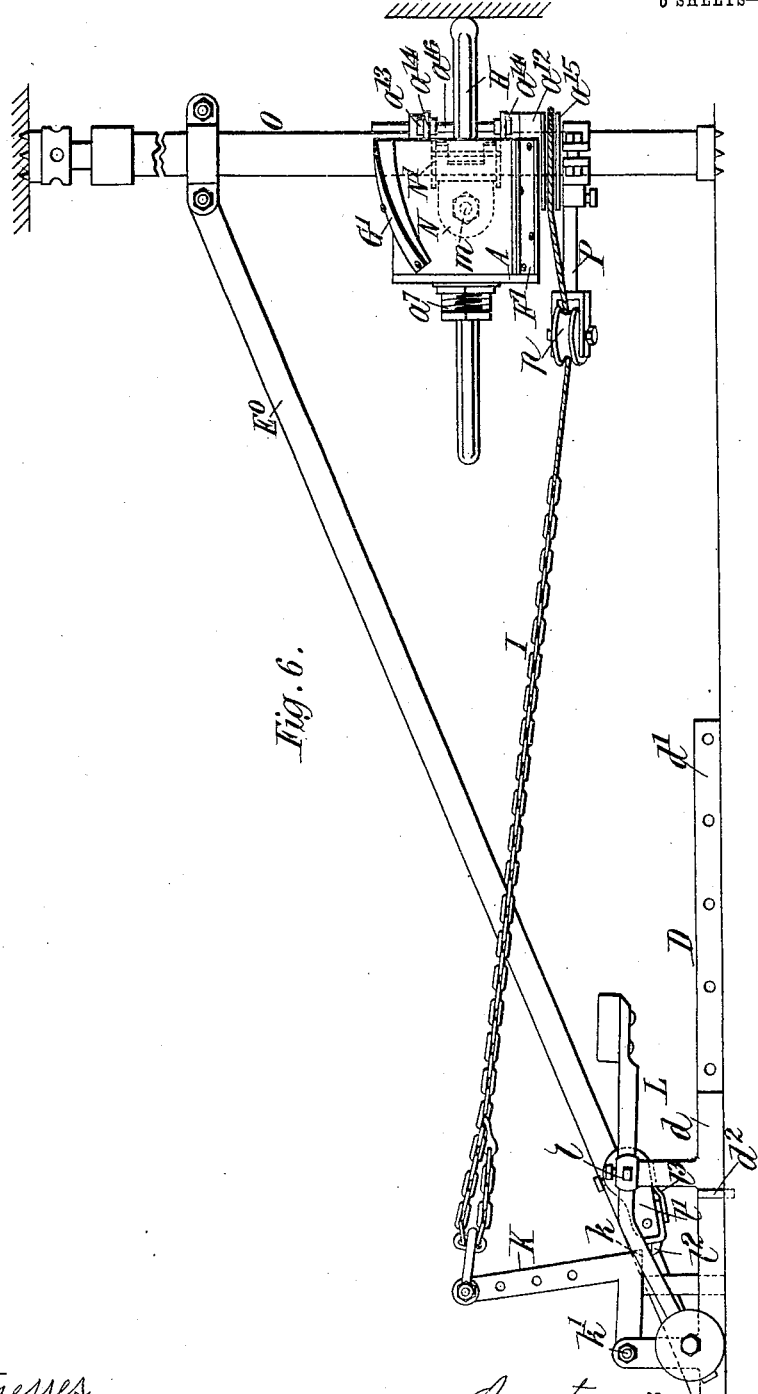

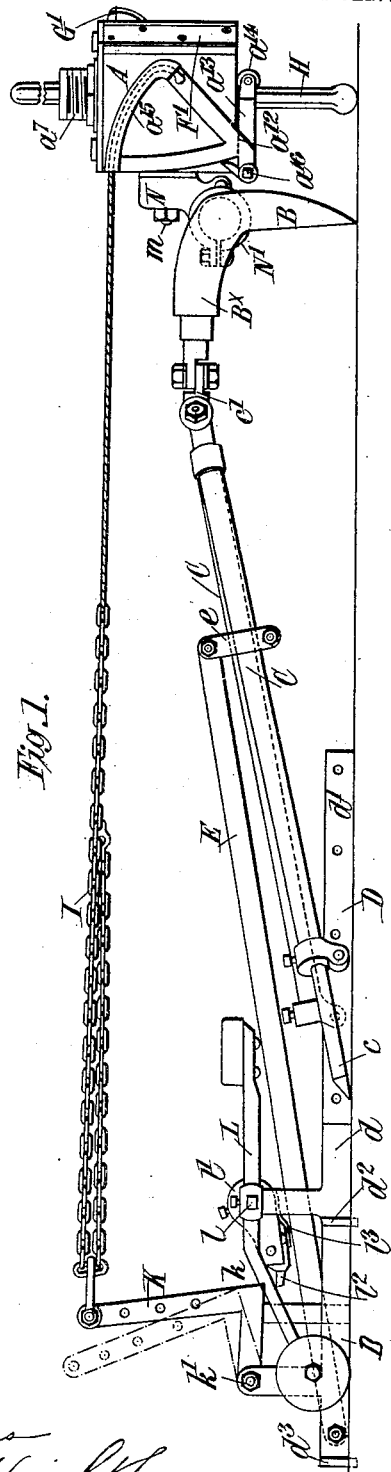

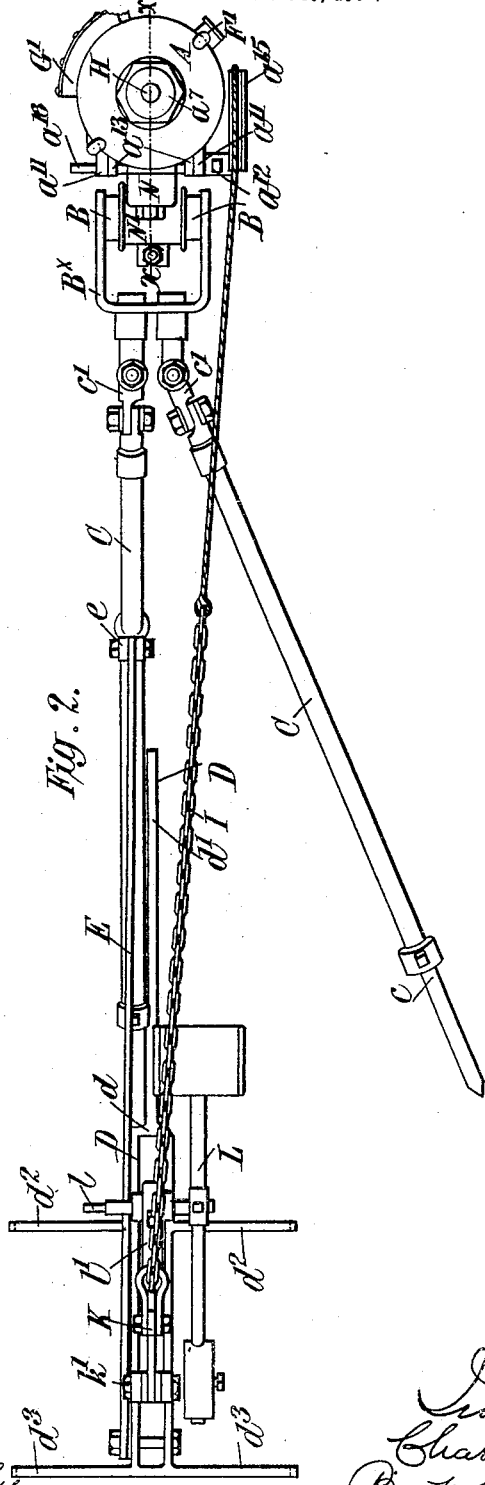

No. 808,876. PATENTED JAN. 2, 1906.
C. SIMMONS.
APPLIANCE FOR LIFTING AND TURNING DRILLS FOR ROCK BORING
AND OTHER PURPOSES.
APPLICATION FILED JAN. 19, 1904.
5 SHEETS—SHEET 3.
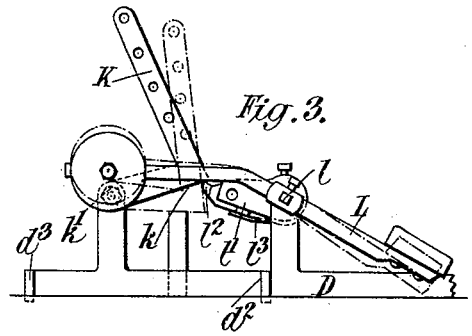
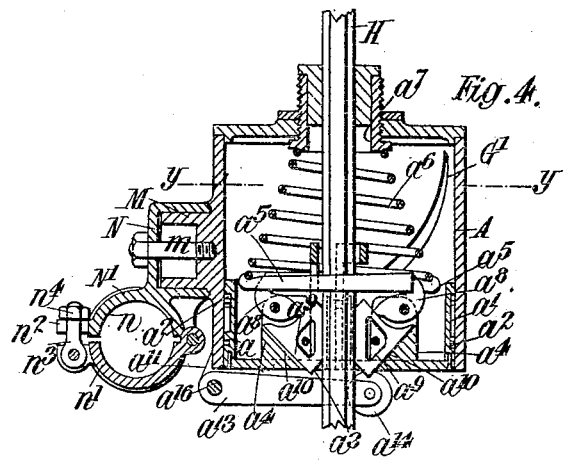
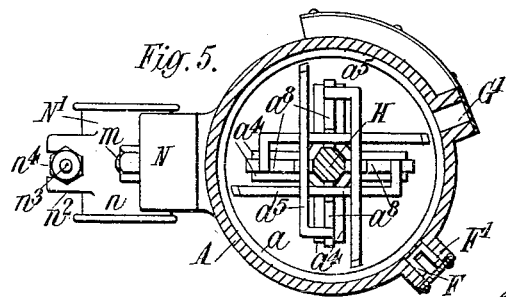

No. 808,876. PATENTED JAN. 2, 1906.
C. SIMMONS.
APPLIANCE FOR LIFTING AND TURNING DRILLS FOR ROCK BORING
AND OTHER PURPOSES.
APPLICATION FILED JAN. 19, 1904.

5 SHEETS—SHEET 4.

Witnesses
O. Knight
Jno. R. Adams

Inventor
Charles Simmons,
by Knight Bros
Attys.

No. 808,876. PATENTED JAN. 2, 1906.
C. SIMMONS.
APPLIANCE FOR LIFTING AND TURNING DRILLS FOR ROCK BORING AND OTHER PURPOSES.
APPLICATION FILED JAN. 19, 1904.
5 SHEETS—SHEET 5.
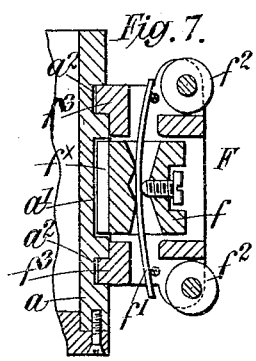
Fig. 7.
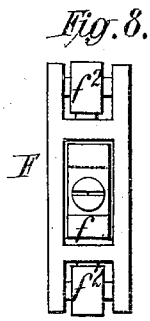
Fig. 8.
Fig. 7.ª
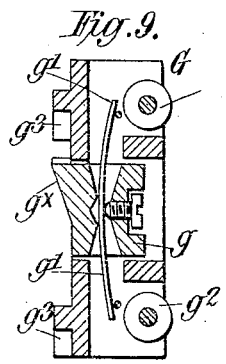
Fig. 9.
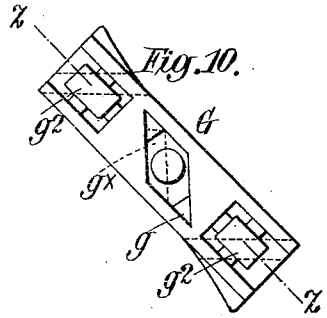
Fig. 10.
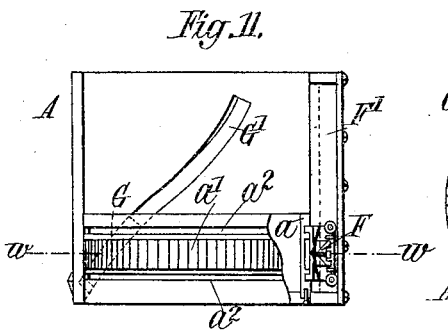
Fig. 11.
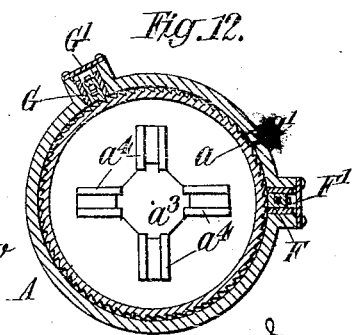
Fig. 12.
Witnesses
Inventor
Charles Simmons
By Knight Bros
Attys.

UNITED STATES PATENT OFFICE.

CHARLES SIMMONS, OF PAIGNTON, ENGLAND, ASSIGNOR TO CHARLES SIMMONS' "DRILLIBITE" LIMITED, OF LONDON, ENGLAND.

APPLIANCE FOR LIFTING AND TURNING DRILLS FOR ROCK-BORING AND OTHER PURPOSES.

No. 808,876.      Specification of Letters Patent.      Patented Jan. 2, 1906.

Application filed January 19, 1904. Serial No. 189,753.

*To all whom it may concern:*

Be it known that I, CHARLES SIMMONS, civil and mining engineer, a subject of the King of Great Britain, residing at "Bowreah," Sands Road, Paignton, in the county of Devon, England, have invented certain new and useful Improvements in Appliances for Lifting and Turning Drills for Rock-Boring or other Purposes, of which the following is a specification.

This invention relates to apparatus for use in rock-boring or other purposes in which the tool, such as a boring bar or drill, is carried axially within a cylinder or casing, the said tool being lifted and turned after each stroke by means adapted to be actuated by the weight of the said operator who effects the stroke of the tool.

The apparatus may be employed for boring in connection with any hard material, either in mining or similar operations, in road-repairing, or the like, the drill being capable of adaptation for use in any required attitude or at any desired elevation or angle.

In order that the said invention may be clearly understood and readily carried into effect, I will proceed to describe the same more fully with reference to the accompanying drawings, in which—

Figure 1 is an elevation of the apparatus arranged for operating upon a horizontal or approximately horizontal surface—such, for example, as a "floor," a ledge, or rock in a tunnel or any excavation. Fig. 2 is a plan corresponding with Fig. 1. Fig. 3 is a view of the foot-lever and parts in connection therewith, illustrating the position of the catch after the lifting and turning movements have been effected. Fig. 4 is a vertical section taken on the line $x$ $x$ in Fig. 2. Fig. 5 is a transverse section taken on the line $y$ $y$ in Fig. 4. Fig. 6 is an elevation of the apparatus arranged for operating upon a vertical or approximately vertical surface, the drill holder or cylinder being carried by a spreader-bar. Fig. 7 is a vertical section of the pawl and catch which traverses the straight channel or passage in the cylinder or casing, the said pawl and catch being shown in engagement with the teeth and annular grooves, respectively, of the piston. Fig. 7$^a$ is a transverse section of the catch. Fig. 8 is an elevation corresponding with Fig. 7. Fig. 9 is a view similar to Fig. 7, illustrating the pawl and catch which traverses the curved channel or passage in the cylinder or casing, the section being taken along the line $z$ $z$ in Fig. 10. Fig. 10 is an elevation corresponding with Fig. 9. Fig. 11 is an elevation and partial section of the piston and cylinder or casing, showing the pawls in their relative positions. Fig. 12 is a section taken along the line $w$ $w$ in and corresponding with Fig. 11.

The apparatus comprises a cylinder or casing A, of cast-iron, steel, or other suitable metal, mounted upon prongs B B, which in the construction illustrated are formed or provided on a stand B$^\times$, connected with a strut or bar C, detachably connected with the frame D pertaining to the foot-lever, a lengthening-bar and stiffener E being also detachably connected with the said frame and secured to the strut or bar C by means of the clip $e$. The stand B$^\times$ may be arranged for the attachment thereto of struts or bars C, so as to serve as legs for supporting the cylinder or casing at an elevation, the said bars or struts being provided with extensible or telescopic ends $c$, whereby their length may be varied as occasion may require. The said bars or struts are preferably connected with the stand B$^\times$ by means of angularly-adjustable joints $c'$ $c'$. The cylinder may, however, be clamped or secured to a cross-bar or column, the cylinder being adapted to swivel in such a manner as to be capable of assuming any desired position for working.

Arranged within the cylinder A is a cup-shaped piston $a$, the lip or rim of which is formed or provided with serrations or teeth $a'$ and annular grooves or depressions $a^2$ $a^2$, pawls F G engaging with the said teeth and grooves, as will be hereinafter more particularly described. The piston $a$ is provided with an aperture $a^3$ at or about its center for the passage of the tool H, lugs $a^4$ being arranged radially about the said aperture $a^3$ and extending upwardly from the inner face of the piston $a$. Pivoted in the lugs $a^4$ are levers $a^5$, which are operated or pressed upon at their outer or free extremities by one end of a coil-spring $a^6$, the other end of the said spring bearing against a flanged socket $a^7$, formed or provided in the end or cover of the cylinder or casing A. The pivoted portion of each of the levers $a^5$ is formed with a cam $a^8$, adapted to operate with more or less energy against a wedge $a^9$, the latter having one edge parallel, or approximately so, with the axis of the piston and of the boring bar or tool and each being arranged to slide upon an inclined plane $a^{10}$, which may be formed integrally with the piston $a$ and its respective lug $a^4$. Assuming the tool H to be in position, (see Fig. 4,) the cams $a^8$ take a bearing against the wedges $a^9$ and owing to the pressure exerted by the spring $a^6$ force the said wedges $a^9$ radially toward the center and into intimate gripping contact with the sides of the tool H. The levers $a^5$ are preferably arranged in pairs, the one pair working at right angles to the other pair. It will be seen that the construction and relation of the cam-levers $a^5$ to the gripping-wedges $a^9$ render the device capable of gripping and holding tools of various sizes with equal certainty. Toward the end of the cylinder remote from the cover are lugs $a^{11}$, in which a cranked lever $a^{12}$ is pivoted. Each arm $a^{13}$ of this lever carries antifriction-rollers $a^{14}$, adapted to bear against the outer face of the piston $a$. The arm $a^{15}$ of the said lever $a^{12}$ extends along the side of the cylinder A and may be conveniently formed as a quadrant adapted to receive a chain or wire rope I or other flexible shafting or connection, the latter being secured by a shackle or any convenient adjustable device to a cranked arm K, arranged for operation by means of a foot-lever L, hinged or pivoted in a pedestal, frame, or stand, such as D. The pivot $a^{16}$ of the cranked lever $a^{12}$ is preferably prolonged, so that the quadrant-shaped portion $a^{15}$ may be applied upon either side of the cylinder A.

The frame D may, as illustrated, comprise a longitudinal portion $d$, having a forwardly and centrally extending bar $d'$ and transverse bars $d^2$ $d^3$. The bar $d'$ being arranged centrally permits of the struts C lying in or about the center line of the frame, and by suitably arranging or extending the pivot $l$ of the foot-lever the latter may be transferred from the one side to the other, so that the apparatus may be rendered capable of use by either a right-handed or a left-handed person. The lever L carries an arm $l'$, provided with a hinged pawl or catch $l^2$, adapted to engage with the cranked arm K on the frame D. Upon depressing the foot-lever the catch $l^2$ engages the angular portion $k$ of the arm K and turns the same about the pivot $k'$, with the effect that a pull is exerted upon the flexible connection I and the cranked lever $a^{12}$ turned through an angle, the arms $a^{13}$ thereupon forcing the piston $a$ into the cylinder A. When the foot-lever has been fully depressed, (see Fig. 3,) the catch $l^2$ passes the angular portion $k$ and the cranked arm K returns to its normal position, as shown in Figs. 1, 2, and 6. The foot-lever thereupon resumes the position shown in Figs. 1, 2, and 6, and in so doing the catch $l^2$ turns about its pivot, slides along the upwardly-extending portion of the arm K, and regains its operative position by the action of a spring, such as $l^3$.

In the wall of the cylinder A a straight slot or channel F' and a spiral or curved slot or channel G' are formed for the purpose of accommodating the respective riders or pawls F and G. From the body of each respective rider or pawl projects a movable catch, as indicated at $f$ and $g$, respectively, the said respective catches being held in position by springs $f'$ and $g'$. The riders are each furnished with antifriction-rollers $f^2$ $f^2$ and $g^2$ $g^2$, whereby their travel in the slots or channels is facilitated. The catch $f$ is formed with a tooth $f^\times$, and the catch $g$ is formed with a tooth $g^\times$, these teeth engaging with the teeth $a'$, formed around the piston $a$. From the operative face of the rider F projects lugs $f^3$ $f^3$, and from the corresponding face of the rider G project lugs $g^3$ $g^3$, these respective pairs of lugs entering into and engaging in the annular grooves $a^2$ $a^2$, formed in the periphery of the piston $a$ on either side of the teeth $a'$. When the piston $a$ is moved in the axial line in the cylinder A by means of the lever $a^{12}$ and the spring $a^6$ compressed, the pawls travel along with the piston in the respective slots or channels, the catches being so arranged that the one pertaining to the rider or pawl which works in the spiral or curved slot or channel will engage the teeth $a'$ and impart a turning movement to the piston, and consequently to the tool H, while the other pawl will ride freely over the teeth $a'$. Upon the pressure of the lever $a^{12}$ being released, owing to the catch $l^2$ pertaining to the foot-lever L escaping from engagement with the angular portion $k$ of the arm K, the piston is returned by the spring $a^6$ acting upon the cam-levers $a^5$, the piston being held against rotation by the catch on the pawl which works in the straight slot or channel. The degree of turn imparted to the piston is dependent upon the pitch or throw of the spiral or curved slot. During the inward and turning movements of the piston $a$ the teeth $a'$ ride over the catch $f^\times$, the catch $g^\times$ engaging the said teeth and, owing to the travel of the said catch $g^\times$ in the spiral or curved slot, imparting the turning movement to the piston. The tool H is by this operation withdrawn from the work. During the return movement or outward stroke of the piston incidental to the removal of pressure by the receding of the lever $a^{12}$ and the expansion of the spring $a^6$ the piston is held against rotation by the catch pertaining to the pawl which works in the straight slot or channel, the catch pertaining to the other pawl being meanwhile pressed out of gear by the teeth $a'$ of the piston. During this outward or return stroke of the piston the boring-tool is carried up again to the work, there being sufficient initial force communicated by the expansion of the spring to the cam-levers and wedges to insure the tool being securely held or suspended whether the operation be directed in an upward or any other direction.

The cylinder or casing A is provided on one side with a boss or journal M, adapted to form part of what may be termed a "universal joint" or "swivel and clamp." The boss or journal M is arranged in such a manner as to be capable of rotating within a circular casing or sleeve N, which is secured upon the said boss by means of a screwed stud $m$, adapted to project and screw into the interior of the boss or journal M. The casing or sleeve N forms part of a clamping arrangement N', whereby the cylinder A may be secured to a supporting bar or column or a bar forming part of a tripod or stand for conveniently supporting the apparatus while in use. In the drawings the clamping arrangement comprises a pair of jaws $n\ n'$, whereof one, $n$, is made integral with the sleeve N and is furnished with a slotted projection $n^2$, while the other or movable jaw $n'$ is hinged to the jaw $n$ and carries a swivel-pin $n^3$, the jaws being secured about the bar or other support by tightening the nut $n^4$ after having closed the jaws $n\ n'$ about the support and turned the pin $n^3$ into the slot of the projection $n^2$. By these means the cylinder A may be adjusted in any desired position for working.

In Fig. 6 the apparatus is shown adapted for employment with a spreader-bar O. This bar may be of any suitable length or be made telescopic or otherwise extensible. The frame D, pertaining to the foot-lever, is secured in position by means of the strut $E^0$, the casing or cylinder A being secured to the spreader-bar by means of the aforesaid clamping device N'. In order that the quadrant portion $a^{15}$ of the lever $a^{12}$ may not be subjected to undue lateral strain, the spreader-bar is provided with a bracket P, carrying a sheave $p$ for guiding the flexible connection I and preserving a straight pull on the quadrant portion $a^{15}$.

What I claim, and desire to secure by Letters Patent of the United States, is—

1. A drill lifting and turning device comprising a stationary cylinder, a piston movable longitudinally and rotatively therein, spring-pressed gripping devices carried by the said piston, a cranked lever pivotally connected to the said cylinder and adapted to bear against the outer face of the piston, means connected with said cranked lever to force the piston inward and a foot-lever adapted to actuate said means; the lifting and turning of the drill being thus effected by the weight of the operator and as the result of his recovering the energy necessary for imparting the succeeding blow to the drill.

2. A drill lifting and turning device comprising a stationary cylinder, a piston movable therein, spring-pressed cam-levers carried by said piston, and friction-wedges also carried by said piston and actuated by the said cam-levers.

3. A drill lifting and turning device comprising a stationary cylinder, a piston movable therein, spring-pressed cam-levers carried by said piston, and friction-wedges also carried by said piston and actuated by the said cam-levers, said piston being provided with open slots having inclined surfaces for said wedges to slide in.

4. A drill lifting and turning device comprising a stationary cylinder, a piston movable longitudinally and rotatively therein, spring-pressed cam-levers carried by said piston, friction-wedges also carried by said piston in open slots therein having inclined surfaces, and a cranked lever pivotally connected to the said cylinder and adapted to bear against the outer face of the piston and operable by the foot.

5. A drill lifting and turning device comprising a stationary cylinder, a piston movable longitudinally and rotatively therein, spring-pressed cam-levers carried by said piston, friction-wedges also carried by said piston in open slots therein having inclined surfaces, a foot-operated cranked lever pivotally connected to the said cylinder and adapted to bear against the outer face of the piston, and means for rotating said piston when moved longitudinally in the said cylinder by the said foot-operated cranked lever.

6. A drill lifting and turning device comprising a stationary cylinder, a piston movable longitudinally and rotatively therein, spring-pressed gripping devices carried by the said piston, a cranked arm pivotally connected to the said cylinder and adapted to bear against the outer face of the piston, a foot-lever, a pivoted pawl on said foot-lever, and means actuated by said pawl and connected with and operating the said cranked lever.

7. A drill lifting and turning device comprising a stationary cylinder, a piston movable longitudinally and rotatively therein, spring-pressed gripping devices carried by the said piston, a cranked arm pivotally connected to the said cylinder and adapted to bear against the outer face of the piston, a foot-lever, a pivoted pawl on said foot-lever, and a cranked arm in operative relation to the said pivoted pawl and connected with the said cranked lever.

8. In a drill lifting and turning device, a stationary cylinder, a piston movable longitudinally and rotatively therein, a spring operating against the inner side of the piston, cam-levers carried by the piston and pressed by said spring, wedges also carried by the said piston and in operative relation to said cams, and inclined surfaces formed in slots in said piston for the said wedges to travel upon.

9. In apparatus for use in rock-boring or other purposes, a cylinder having straight and curved slots, a piston movable longitudinally and rotatively in said cylinder and carrying spring-pressed cam-levers and sliding wedges, circumferential grooves and teeth on the piston, an antifriction-rider for working in the said straight slot and an antifriction-rider for working in the said curved slot, projecting lugs on said respective riders for engaging in said grooves, a central spring-controlled tooth portion on each rider for engaging said teeth, and means adapted to move the piston against the pressure of the spring by the weight of the operator.

10. In apparatus for use in rock-boring or other purposes, the combination of the cylinder having straight and curved slots therein, a piston movable longitudinally and rotatively in said cylinder, circumferential grooves and teeth on said piston for engaging with the riders, antifriction-rollers on said riders, a tooth portion slidable transversely in each of said riders, and a spring threaded through the said slidable tooth portion.

11. In apparatus for use in rock-boring or other purposes, the combination of the cylinder having straight and curved slots therein, a piston movable longitudinally and rotatively in said cylinder, circumferential grooves and teeth in said piston, riders, antifriction-rollers on said riders for engaging lugs in said grooves, a tooth portion slidable transversely in each of said riders and engaging said teeth, a spring threaded through the said slidable tooth portion, a cranked lever pivotally connected to the cylinder and bearing against the outer face of said piston, a pivoted arm, a connection between said lever and pivoted arm, and a foot-lever in operative relation to said pivoted arm.

12. In apparatus for use in rock-boring or other purposes, the combination with a lifting and turning device, of a foot-lever, the frame therefor, a strut or bar connection for said frame, a pawl on said foot-lever, a device operative by said pawl, and a cranked lever connected with said device for operating the lifting and turning device.

In testimony whereof I hereunto set my hand, in presence of two subscribing witnesses, this 22d day of December, 1903.

CHARLES SIMMONS.

Witnesses:
T. KELLY WARDLE,
F. J. RAPSON.